US008280559B2

(12) United States Patent
Herman et al.

(10) Patent No.: US 8,280,559 B2
(45) Date of Patent: Oct. 2, 2012

(54) APPARATUS AND METHOD FOR PROVIDING COOLING TO MULTIPLE COMPONENTS

(75) Inventors: Jeffrey Herman, Cupertino, CA (US); Sagheer Ahmad, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 461 days.

(21) Appl. No.: 12/137,436

(22) Filed: Jun. 11, 2008

(65) Prior Publication Data

US 2009/0312874 A1    Dec. 17, 2009

(51) Int. Cl.
*G05D 23/00*    (2006.01)

(52) U.S. Cl. ........ 700/300; 700/275; 700/299; 700/296; 327/262; 327/539; 631/679.48; 388/811; 388/815; 318/471; 415/45; 165/247

(58) Field of Classification Search .......... 700/299, 700/300, 275, 296; 327/262, 539; 631/679.48; 388/811, 815; 318/471; 432/176
See application file for complete search history.

(56) References Cited

U.S. PATENT DOCUMENTS

| | | | | |
|---|---|---|---|---|
| 6,188,189 B1 * | 2/2001 | Blake | | 318/471 |
| 7,190,142 B2 * | 3/2007 | Ha | | 318/599 |
| 7,245,099 B2 * | 7/2007 | Yamamoto et al. | | 318/471 |
| 7,304,521 B2 * | 12/2007 | Carley et al. | | 327/278 |
| 7,376,182 B2 * | 5/2008 | Kris | | 375/238 |
| 7,455,450 B2 * | 11/2008 | Liu et al. | | 374/111 |
| 7,705,689 B2 * | 4/2010 | Harrison et al. | | 332/109 |
| 7,796,867 B2 * | 9/2010 | Miyajima et al. | | 388/811 |
| 8,089,236 B2 * | 1/2012 | Li et al. | | 318/471 |
| 2005/0242858 A1 * | 11/2005 | Figoli et al. | | 327/175 |
| 2006/0064609 A1 * | 3/2006 | Bryan | | 714/700 |
| 2007/0231119 A1 * | 10/2007 | Shen et al. | | 415/47 |
| 2008/0095521 A1 * | 4/2008 | Chen et al. | | 388/829 |
| 2008/0288124 A1 * | 11/2008 | Huang | | 700/300 |
| 2009/0129760 A1 * | 5/2009 | Chiang et al. | | 388/811 |

OTHER PUBLICATIONS

Maxim, "MAX6639 datasheet 2 cahnnel temperature monitor with dual, automatic, PWM fan speed controller", 2005, pp. 1-22.*
Maxim "MAX669 datasheet. Fan controller and remote temperature sensor", 2000, pp. 1-20.*
Analog devices, "TMP05/TMP06 datasheet", 2006, pp. 1-28.*

* cited by examiner

*Primary Examiner* — Charles Kasenge
*Assistant Examiner* — Olvin Lopez Alvarez
(74) *Attorney, Agent, or Firm* — Sterne, Kessler, Goldstein & Fox P.L.L.C.

(57) ABSTRACT

In an embodiment, an integrated circuit includes an input configured to receive a first control signal and an output module configured to generate an output signal based at least on the first control signal and a second control signal generated based at least on a measured temperature of the IC. The output signal is configured to control a cooling device.

20 Claims, 7 Drawing Sheets

APPARATUS AND METHOD FOR PROVIDING COOLING TO MULTIPLE COMPONENTS

BACKGROUND OF THE INVENTION

1. Field of the Invention

The present invention relates to providing cooling for integrated circuits.

2. Related Art

As integrated circuits (ICs) perform operations, they often generate heat. This generated heat can cause problems when it causes the temperature of the IC to rise above a desired maximum temperature. In response, systems have been developed to provide cooling for ICs. For example, fans can provide cooling to one or more ICs.

In one type of cooling system, a fan is assigned to each IC located on a printed circuit board (PCB). In such a system, each IC generates a control signal that is indicative of an amount of cooling required or desired by the IC. However, each of the fans required by the cooling systems can take up space on the PCB and increases cost of the total system. Furthermore, the operation of each of the fans can be based on a polling of the temperature of the each of the respective ICs. Since the polled temperature is often only valid at the time of the poll, the fans often provide cooling based on outdated temperature information.

In an alternative system, a dedicated IC is added to the PCB that measures a temperature and outputs a control signal to a fan based on the measured temperature. However such a system requires an additional devoted IC that takes up space on the PCB and increases the cost of the total system. Furthermore, the dedicated IC may also measure temperature through a series of polls so that cooling signals generated by the dedicated IC may be outdated.

Thus, what is needed is a system and method for providing real-time cooling to multiple ICs with a single fan in space efficient and cost effective manner.

BRIEF SUMMARY OF THE INVENTION

Embodiments described herein relate to methods and systems for providing cooling for multiple integrated circuits. In an embodiment, an integrated circuit (IC) is provided that aggregates the cooling required by another IC with its own cooling requirement. The IC outputs a control signal indicative of the total cooling required by both integrated circuits. The integrated circuit can include an input configured to receive a first control signal and an output module configured to generate an output signal based at least on the first control signal and a second control signal generated based at least on a measured temperature of the IC. The output signal is configured to control a cooling device.

In yet another embodiment, a method in an IC includes generating a first control signal based at least on a temperature of the IC, receiving a second control signal that is generated based at least on a temperature of a second IC, and generating an output signal based on the first control signal and the second control signal. Each of the first control signal, the second control signal, and the output signal are configured to control a cooling device.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Introduction

Figure 1:
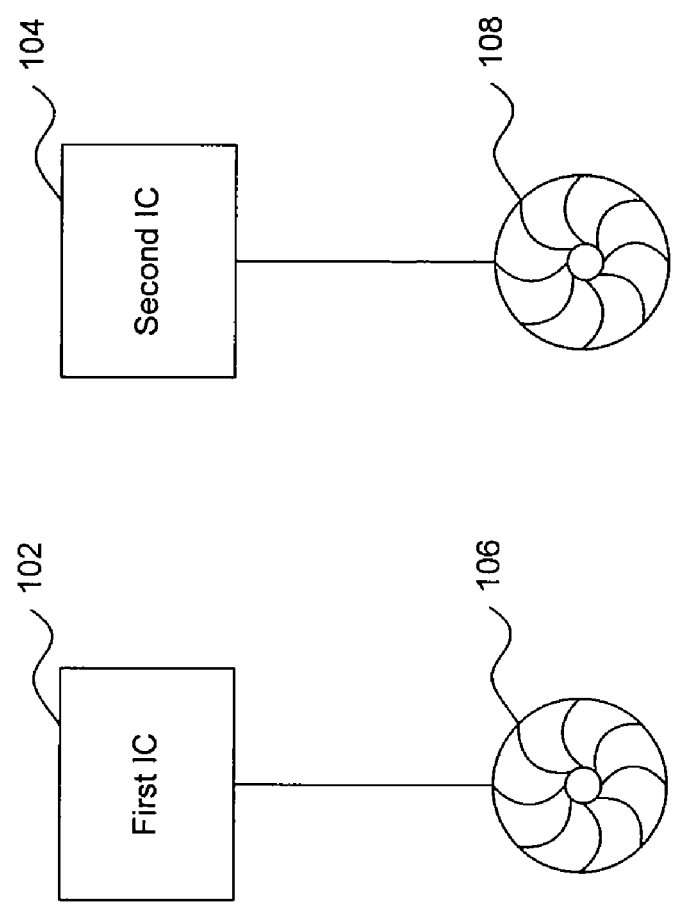
FIGS. 1 and 2 illustrate systems to provide cooling for integrated circuits.

FIG. 1 shows a system 100 that includes a first IC 102, a second IC 104, and fans 106 and 108. System 100 can be integrated on a single printed circuit board (PCB). For example, system 100 can be integrated in a single motherboard of the computer. First and second ICs 102 and 104 can be a variety of different types of circuits. For example, at least one of the first IC 102 and second IC 104 may be a processor or logic component such as a graphics processor unit (GPU). In another example, at least one of first and second ICs 102 and 104 can be an application specific IC (ASIC).

Fans 106 and 108 are configured to provide cooling for first IC 102 and second IC 104, respectively. In an embodiment, first and second ICs 102 and 104 are configured to sense a temperature and generate control signals that are received by fans 106 and 108, respectively. Based on the received signal, fans 106 and 108 provide the desired cooling. For example, first IC 102 may have a desired temperature range in which it operates. When the temperature of first IC 102 exceeds the desired range, cooling is provided. The control signal output by first IC 102 can be generated based on the amount of cooling required so that its temperature remains in the desired range.

In an embodiment, the generated control signals are pulse width modulated (PWM) signals. By way of background, a PWM signal consists of multiple periods with each period having an associated duty cycle. The duty cycle of a period specifies a ratio between the length over which the signal is at a voltage high and the length of the period. The length of each period of a PWM signal is typically the same. For example, a PWM signal that includes a period that has a duty cycle of 4/16 and a length of 16 clock cycles is at a voltage high for 4 clock cycles and at a voltage low for the remaining 12 cycles of the period.

As the duty cycle of a PWM control signal period increases, the revolutions per minute (RPM) of the fan that receives the PWM signal also increases. Thus, the amount of cooling provided by fan(s) 106 and/or 108 over a period is determined by the duty cycle of a received PWM control signal during that period.

As shown in FIG. 1, each of first and second ICs 102 and 104 has a dedicated fan. Although such a system may provide cooling for both first and second ICs 102 and 104, such a system is also inefficient in terms of cost and space. As the number of ICs in system 100 increases, the total cost of the fans used to cool the ICs also increases. Moreover, as the number of ICs increases in system 100, the total space taken up by fans in system 100 also increases. The total area taken up by fans is especially important when system 100 is implemented on a single PCB.

Figure 2:
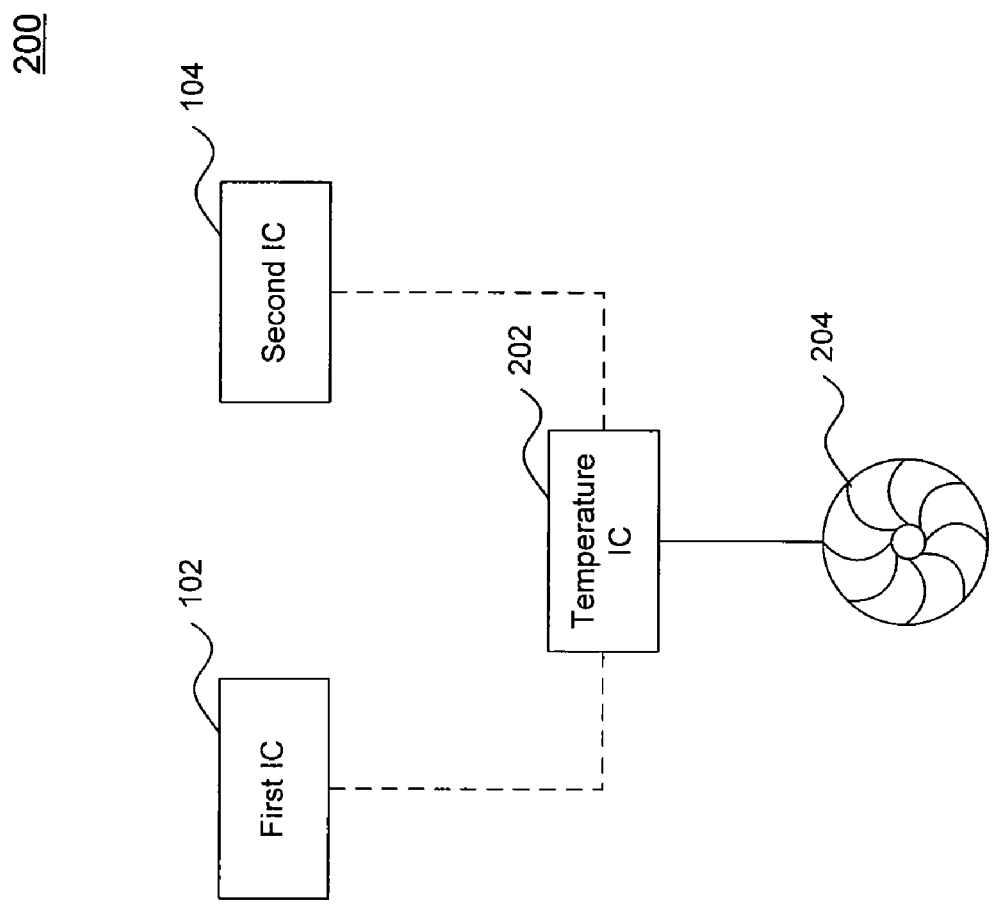

FIG. 2 shows a system 200 that includes first IC 102, second IC 104, a temperature IC 202, and a fan 204. Similar to system 100, system 200 can be integrated on one single PCB or circuit board. Temperature IC 202 is configured to output a control signal that is indicative of a cooling required by first and second ICs 102 and 104. As shown in FIG. 2, temperature IC 202 is optionally coupled to first IC 102, and second IC 104. In such an embodiment, temperature IC 202 can be a processing device that periodically polls the temperatures of first IC 102 and second IC 104. Based on the polled temperatures, temperature IC 202 generates the control signal that controls the operation of fan 204. However, since polled temperatures may only be valid at the instant at which they are taken, cooling may be provided to first IC 102 and/or second IC 104 based on temperatures that are no longer valid. Furthermore, control signals generated in such a manner may also not be able to sudden changes in the temperatures of first IC 102 and/or second IC 104. For example, if the sudden change in temperature occurs between polling instants, it may be not be addressed until the next polling instant. Furthermore, as would be appreciated by those skilled in the relevant art(s) based on the description herein, polling the temperatures of first and second ICs 102 and 104 may require more activity from temperature IC 202, requiring it to be "awake" for more time, thus increasing the power used.

Alternatively, temperature IC 202 is not coupled to first and second ICs 102 and 104. In such an embodiment, temperature IC 202 senses a temperature associated with the first and second ICs 102 and 104 and generates the control signal accordingly. In such an embodiment, temperature IC 202 can take periodic measurements of the temperature associated with first and second ICs 102 and 104. As described above, measuring temperature at periodic instants may result in temperature IC 202 not being able to provide real time response to cooling requirements and not being able to react to sudden changes in temperature.

Alternatively, temperature IC 202 can be an IC dedicated to providing control signals for fan 204. Although such an embodiment does not require a separate fan for each of first and second ICs 102 and 104, system 200 does require an additional IC (e.g., temperature IC 202) that is devoted to help provide cooling. Temperature IC 202 then increases the total cost of system 200 and may take up space on a PCB used to implement system 200.

In alternate embodiments, temperature IC 202 is not included. For example, first and second ICs 102 and 104 can include software that allows them to communicate temperature data. Such a configuration may also rely on polling temperature data, and thus, may not be able to guarantee real time adjustments to temperature changes in first IC 102 and/or second IC 104. Such a system also may not be able to respond to sudden changes in temperatures of first IC 102 and/or second IC 104.

In another embodiment, a dedicated protocol is used to communicate temperature data between first and second ICs 102 and 104. For example, the inter-integrated circuit ($I^2C$) protocol can be used. Such an embodiment also suffers from the lack of ability to guarantee real time adjustments temperature and to respond to sudden changes. Additionally, such an embodiment also requires dedicated pins on first IC 102 and second IC 104.

Exemplary Cooling Embodiments

In embodiments described herein, ICs of a system of configured such that real-time cooling is provided for multiple ICs with a single fan without the need for additional circuits or components.

Figure 3:
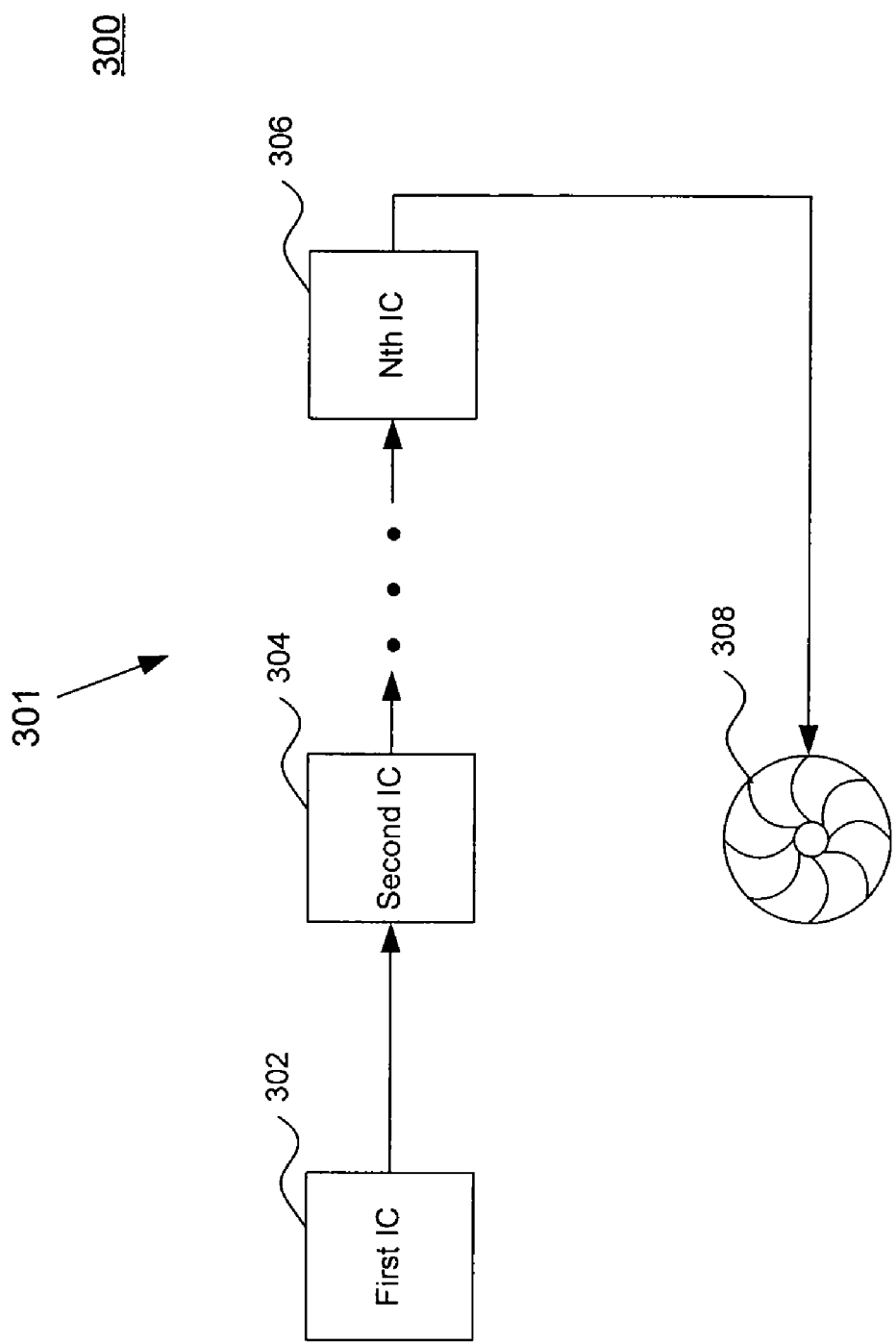
FIG. 3 illustrates a system to provide cooling for ICs, according to an embodiment of the present invention.

FIG. 3 shows a system 300 that includes a serial chain of ICs 301 and a fan 308. Chain 301 includes N ICs. N can be any integer number greater than or equal to one. For example, chain 301 includes a first IC 302, a second IC 304, and an Nth IC 306. At least one IC of chain 301 is a processor (e.g., GPU). In another embodiment, at least one IC of chain 301 is an ASIC. As shown in FIG. 3, chain 301 includes N ICs coupled together in a daisy chain configuration in which each IC is coupled to two adjacent ICs except for first IC 302 and Nth (e.g., last) IC 306 that each only have one adjacent IC.

Fan 308 provides cooling based on a control signal output by Nth IC 306. Each IC of chain 301 communicates a control signal to an adjacent IC, except for Nth IC 306 that communicates its control signal to fan 308. For example, first IC 302 communicates a control signal indicative of a required cooling to second IC 304. Second IC 304 also generates a control signal indicative of its own cooling requirement and combines the locally generated control signal with the received control signal from first IC 302 and outputs a combined control signal that is received by the next IC of chain 301. Thus, the control signal output by first IC 302 is effectively updated by each IC of chain 301 with its own cooling requirement. The control signal output by Nth IC 306, then, includes the cooling requirements of each IC in chain 301.

The control signal received by fan 308 is the worst case cooling required by all ICs of chain 301. For example, in the case in which chain 301 includes three ICs, i.e., N is 3, and first IC 302, second IC 304, and Nth (e.g., third) IC 306 require cooling in a given period corresponding to duty cycles of 4/16, 3/16, and 7/16, respectively, fan 308 receives a PWM control signal with a duty cycle of 7/16 during the given period.

As shown in FIG. 3, system 300 has one fan (e.g., fan 308) for all the ICs in chain 301 and does not include an additional circuit that is devoted to cooling. Thus, system 300 provides cooling to ICs of chain 301 while avoiding the inefficiency with respect to cost and board space resident in systems 100 and 200, described with reference to FIGS. 1 and 2, respectively.

Moreover, since the control signal is effectively updated by each IC in the chain 301, fan 308 receives a control signal from Nth IC 306 that provides real time cooling requirements of all ICs in chain 301 and is able to capture sudden temperature changes of any of the ICs of chain 301.

Furthermore, each IC in chain 301 can have an identical configuration with respect to the reception and generation of cooling control signals. In another embodiment, the period of the control signal generated by each IC in chain 301 is identical. As would be appreciated by those skilled in the relevant art(s) based on the description herein, control signals having the same period may be simpler to combine than control signals having different periods. Thus, ICs of chain 301 do not have to be in a specified order. This can provide flexibility in board design.

Figure 4:
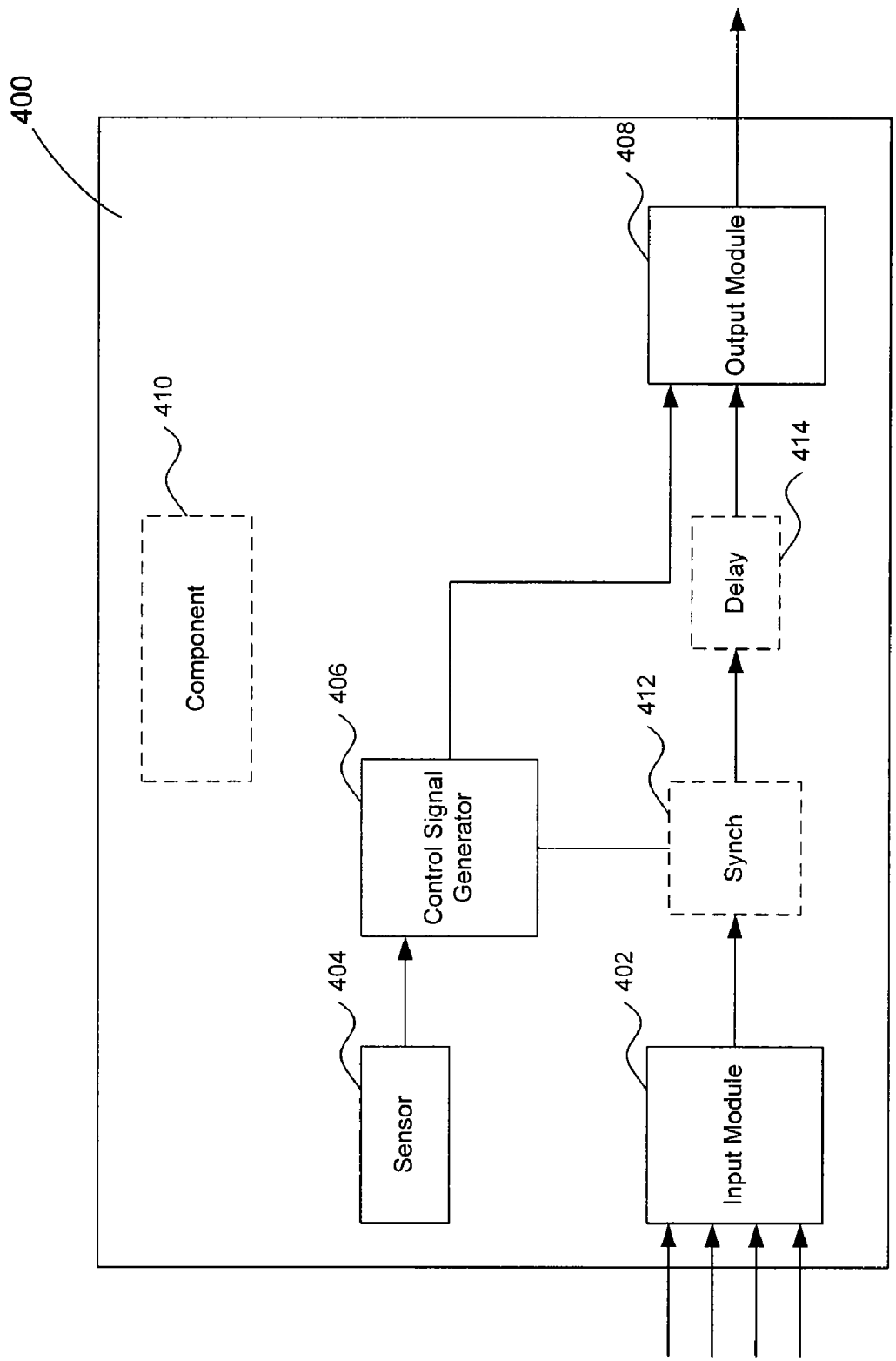
FIG. 4 is a block diagram illustration of an IC, according to an embodiment of the present invention.

FIG. 4 shows a functional diagram of an IC 400, according to an embodiment of the present invention. In FIG. 4, IC 400 is an IC of a chain of ICs similar to chain 301 of FIG. 3. IC 400 includes an input module 402, a sensor 404, a control signal generator 406, and an output module 408. IC 400 optionally includes a component 410, a synchronization module 412, and a delay module 414.

Sensor 404 is configured to sense a temperature of IC 400 and generate a corresponding signal. Control signal generator 406 receives the signal from sensor 404 and generates a control signal (e.g., a PWM signal). The sensor 404 senses a core temperature of IC 400, determines a duty cycle corresponding to an RPM of a fan that will provide a desired amount of cooling, and generates a signal that includes the determined duty cycle. Control signal generator 406 receives the determined duty cycle and generates a period of the PWM control signal having the determined duty cycle.

Input module 402 is configured to receive an input control signal. For example, input module 402 can be configured to receive an input control signal from an IC that precedes IC 400 in a chain of ICs. Output module 408 is configured to combine the input control signal with the control signal locally generated by control signal generator 406 into an output control signal. For example, output module 408 may logically OR an input PWM control signal with a locally generated PWM control signal to form an output PWM control signal.

In an embodiment, each IC of a chain that includes IC 400 generates control signals with the same period lengths. However, each IC of the chain of ICs might not be synchronized with other ICs of the chain. For example, a preceding IC may not be synchronized with IC 400. This can result in an undesired combination of the input control signal and the locally generated control signal at output module 408 because the two control signals are not in-phase. Moreover, the size (e.g., number of clock cycles) of a phase shift between the input control signal and a locally generated control signal is unknown. In order to ensure that the two control signals are combined in-phase, IC 400 also optionally includes synchronization module 412 and delay module 414.

Synchronization module 412 is configured to synchronize the operation of control signal generator 406 with the input control signal. Synchronization module 412 is configured to detect a characteristic (e.g., a rising or falling edge) of the input control signal and generate a synchronization signal (e.g., rectangular pulse). Control signal generator 406 then adjusts the locally generated control signal according to the synchronization signal. As a result of the synchronization, the locally generated control signal is adjusted so that it is in-phase with the input control signal. Furthermore, synchronization module 412 can also include a dual-flip flop clock-boundary synchronizer. As would be appreciated by those skilled in the relevant art(s) based on the description herein, as the input signal crosses a clock boundary (i.e., from the IC that generated it to IC 400), it may develop meta-stable values. A dual-flip flop clock-boundary synchronizer can remove meta-stable portions of the input signal. In another embodiment, the dual-flip flop clock-boundary synchronizer may also be included in input module 402.

Delay module 414 is configured to delay the input control to account for processing by synchronization module 412 and control signal generator 406. The delayed input control signal and the locally generated control signal are combined in-phase at output module 408 to produce the output control signal.

IC 400 also includes a component 410 that performs an operation unrelated to cooling IC 400. For example, component 410 may be configured to perform operations related to graphics processing. In alternate embodiments, component 410 can be another type of logic device or other type of component. Thus, IC 400 can be an IC that is not devoted to providing cooling to elements of a system. However, with the addition of the elements described above, IC 400 can also generate a cooling control signal with other ICs of a chain.

Exemplary Implementation

Figure 5A:
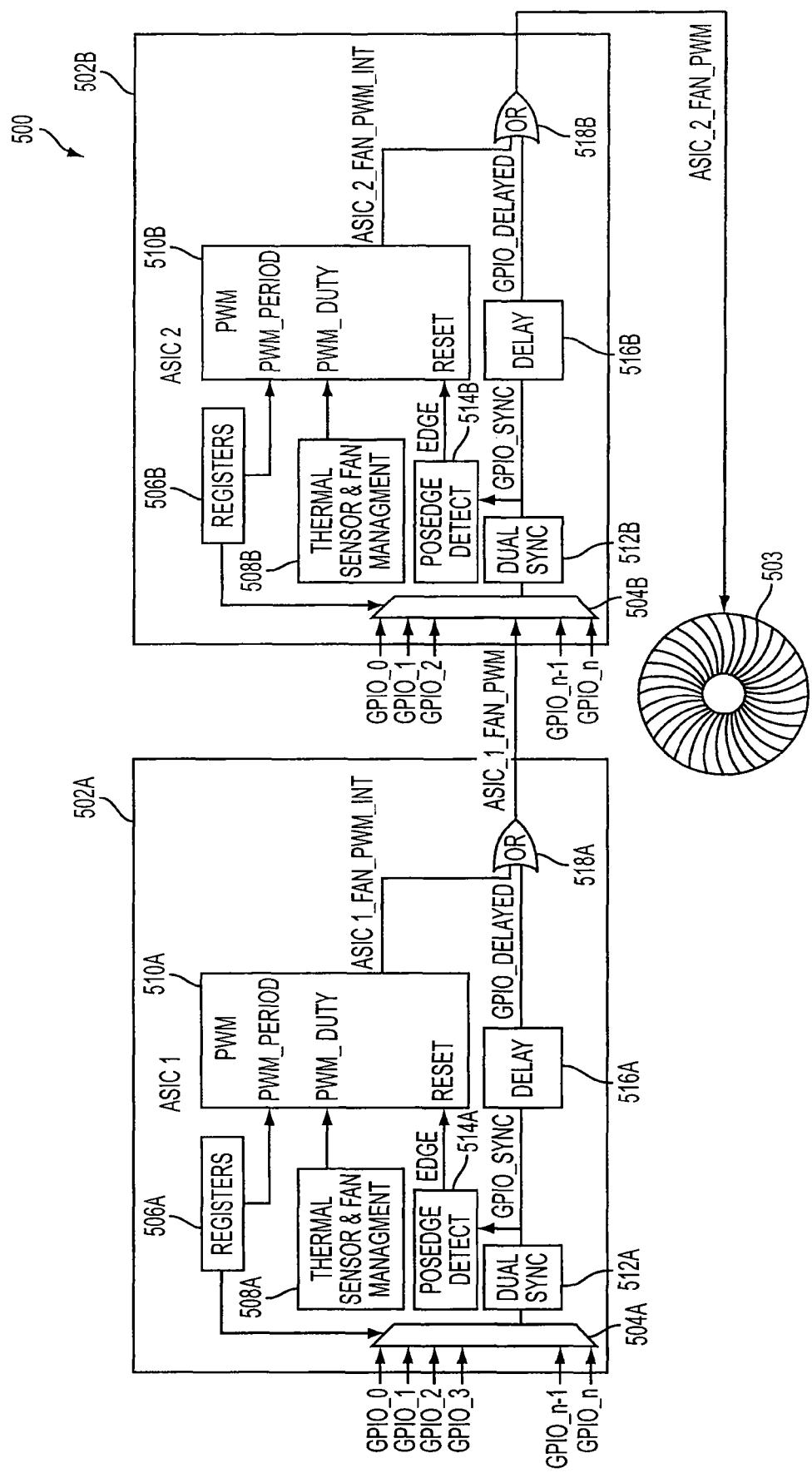
FIG. 5A illustrates a system to provide cooling to ICs, according to an embodiment of the present invention.
Figure 5B:
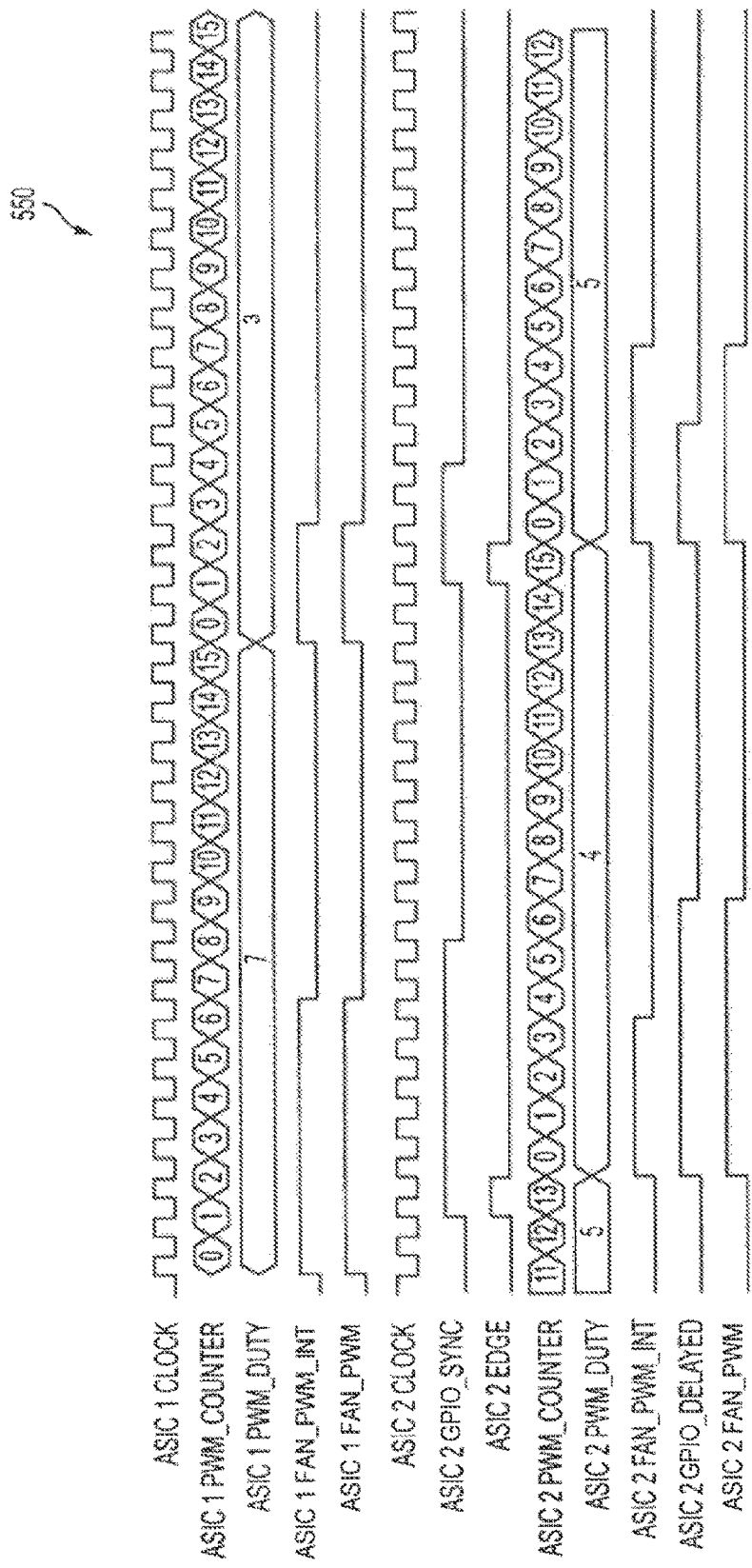
FIG. 5B shows a waveform diagram corresponding to a system that provides cooling, according to an embodiment of the present invention.

FIG. 5A shows a system 500 and FIG. 5B shows a waveform diagram 550 corresponding to an exemplary operation of system 500, according to embodiments of the present invention. System 500 includes a first IC 502A and a second IC 502B. At least one of first and second ICs 502A and 502B can be ASICs. First and second ICs 502A and 502B include multiplexers 504A and 504B, registers 506A and 506B, thermal sensor and fan management modules 508A and 508B, PWM control signal generators 510A and 510B, dual synchs 512A and 512B, edge detect modules 514A and 514B, delay modules 516A and 516B, and OR gates 518A and 518B, respectively. System 500 also includes a fan 503.

The circuit diagrams of first and second ICs 502A and 502B correspond to an implementation of IC 400, described with reference to FIG. 4. For example, input module 402 can include a multiplexer similar to multiplexer 504A, and sensor module 404 can be implemented as thermal sensor and fan management module 508A. Control signal generator 406 can be implemented as PWM control signal generator 510A. Synchronization module 412 can include dual synch 512A and edge detect module 514A and delay module 414 can be implemented as delay module 516A. Finally, output module 408 can include OR gate 518A.

The waveforms of waveform diagram 550, shown in FIG. 5B, correspond to an exemplary operation of system 500. For example, clocks of first and second ICs 502A and 502B generate signals corresponding to waveforms ASIC 1 clock and ASIC 2 clock, respectively.

Thermal sensor and fan management modules 508A and 508B are configured to sense temperatures (e.g., core temperatures) of first and second ICs 502A and 502B, respectively, and generate respective duty cycle values. For example, sensor and fan management module 508A senses a temperature of first IC 502A and generates a signal corresponding to a waveform ASIC 1 pwm_duty, shown in FIG. 5B. Waveform ASIC 1 pwm_duty specifies duty cycle values of $7/16$ during a first period, where a period is 16 clock cycles of waveform ASIC 1 clock, and $3/16$ during a second period. Similarly, sensor and fan management module 508B generates a signal corresponding to a waveform ASIC 2 pwm_duty, shown in FIG. 5B, corresponding to a duty cycle of $4/16$ during a first period and $5/16$ during a second period.

PWM control signal generators 510A and 510B are configured to generate PWM control signals based on the duty cycle values generated by thermal sensor and fan management modules 508A and 508B, respectively. For example, PWM control signal generator 510A generates a PWM control signal corresponding to a waveform ASIC 1 FAN_PWM_INT shown in FIG. 5B, based on the duty cycle values generated by thermal sensor and fan management module 508A.

As shown in FIG. 5B, waveform ASIC 1 FAN_PWM_INT is at a voltage high for 7 clock cycles of the first period and is at a voltage low for the remaining 9 cycles of the first period and is at a voltage high for 3 clock cycles of the second period and at a voltage low for the remaining 13 cycles, corresponding to the duty cycle values $7/16$ and $3/16$ for the first and second periods, respectively, specified by waveform ASIC 1 pwm_duty.

Similarly, PWM control signal generator 510B generates a PWM control signal corresponding to a waveform ASIC 2 FAN_PWM_INT shown in FIG. 5B, based on the duty cycle values generated by thermal sensor and fan management module 508B. As also shown in FIG. 5B, waveform ASIC 2 FAN_PWM_INT is at a voltage high for 4 clock cycles of waveform ASIC 2 clock and is at a voltage low for the remaining 12 cycles of a first period and is at a voltage high for 5 clock cycles and at a voltage low for the remaining 11 cycles of a second period, corresponding to the duty cycle values $4/16$ and $5/16$ for the first and second periods, respectively, specified by waveform ASIC 2 pwm_duty.

In a further embodiment, the length of a period (e.g., the number of clock cycles) is determined by values stored in registers 506a and 506b. For example, PWM control signal generators 508A and 508B may operate based on internal counters that produce signals corresponding to waveforms ASIC 1 pwm_counter and ASIC 2 pwm_counter, respectively. Both waveforms ASIC 1 pwm_counter and ASIC 2 pwm_counter count from 0 to 15, when either waveform returns count 0, new period of waveforms ASIC 1 FAN_PWM_INT and ASIC 2 FAN_PWM_INT begins. Values stored in registers 506A and 506B can control the range of values over which waveforms ASIC 1 pwm_counter and ASIC 2 pwm_counter count, and thus the length of a period.

Multiplexers 504A and 504B each include n+1 general purpose input/output (GPIO) pins GPIO_0-GPIO_n and pass the signal received at one of the these pins as an input control signal. For example, values stored in registers 506a and 506b may indicate that input control signals will be received at GPIO_3 for both multiplexers 504A and 504B. Accordingly, multiplexer 504A will pass the signal received at GPIO_3 to dual synch 512A. Since first IC 502A does not have an IC that precedes it, a control signal is not received by multiplexer 504A. Thus, the input control passed by multiplexer 504A is simply a signal consisting of all voltage lows (e.g., a signal with no informational content).

Dual sync 512A, edge detect module 514A, and delay module 516A all are configured so that the input control signal is combined in-phase with the locally generated control signal (e.g., the control signal generated by PWM control signal generator 510A). However, since the input control signal for first IC 502A is always at a voltage low, delay module 516A outputs a signal of all voltage lows to OR gate 518A.

OR gates 518a and 518b are configured to OR input signals to produce combined output signals. For example, OR gate 518A ORs the signal of a voltage lows output by delay module 516A with the locally generated control signal to generate a combined control signal corresponding to a waveform ASIC_1_FAN_PWM, shown in FIG. 5B. As shown in FIG. 5B, waveform ASIC 1 FAN_PWM is identical to waveform ASIC 1 FAN_PWM_INT, since, as described above, the input control signal to first IC 502A consists of all voltage lows.

Multiplexer 504B receives the combined control signal generated by OR gate 518A as an input control signal at its GPIO_3 pin and outputs a signal corresponding to a waveform ASIC2 gpio_sync, shown in FIG. 5B. As shown in FIG. 5B, waveform ASIC2 gpio_sync contains the same content as waveform ASIC 1 FAN_PWM (i.e., the duty cycles of the periods are the same), but is not in-phase with waveform ASIC 2 pwm_counter (i.e., the rising edge of waveform ASIC 2 gpio_sync is not aligned with the start of a count 0 by ASIC 2 pwm_counter). Thus, synchronization between the input control signal at second IC 502B and PWM control signal generator 510B may be needed so that control signals generated locally at second IC 502B are combined in-phase with the input control signal.

Dual syncs 512A and 512B are configured to remove metastable components of the input control signal that may develop when clock domains are crossed, as described above. The input control signal is then passed to edge detect module 514B. Edge detect modules 514A and 514B are configured to detect a rising (e.g., positive) edge of an input control signal and produce a signal when the rising edge is detected.

For example, edge detect module 514B produces a signal corresponding to waveform ASIC2 edge, shown in FIG. 5B. As shown in FIG. 5B, the rising edge of ASIC2 edge corresponds with the rising edge of ASIC2 gpio sync. Based on the synchronization signal output by edge detect module 514B, PWM control signal generator 510B resets its operation. For example, as shown in FIG. 5B, waveform ASIC 2 pwm_counter, and therefore waveform ASIC 2 FAN_PWM_INT, is reset based on waveform ASIC2 edge.

The input control signal is also received by delay module 516B. Delay modules 516A and 516B are configured to delay input signals. For example, as shown in FIG. 5B, waveform ASIC2 gpio_sync is one clock cycle out of phase with waveform ASIC 2 FAN_PWM_INT. Delay module 516B delays the input control signal by one clock cycle producing a signal corresponding to waveform ASIC2 gpio_delayed. Thus, delay module 516B delays the input signal to account for the synchronization processing of dual synch 512B, edge detect module 514B, and PWM control signal generator 510B. As shown in FIG. 5B, waveform ASIC2 gpio_delayed is in-phase with waveform ASIC 2 FAN_PWM_INT.

OR gate 518B then ORs the locally generated control signal with the delayed input control signal to generate the combined output control signal corresponding to a waveform ASIC 2 FAN_PWM, shown in FIG. 5B. As shown in FIG. 5B, ASIC 2 FAN_PWM is the result of an ORing operation between waveforms ASIC2 gpio_delayed and ASIC 2 FAN_PWM_INT. The combined output control signal can then be used to control the operation of fan 503.

Thus, dual syncs 512A and 512B, edge detect modules 514A and 514B, and delay modules 518A and 518B allow for input control signals to be combined in-phase with locally generated control signals. The phase shift between an input control signal and a locally generated control signal is typically unknown. Edge detect modules 514A and 514B effectively shift locally generated control signals so that the locally generated control signals and the input control signals are in-phase. Delay modules 516A and 516B then shift input control signals to account for processing by dual syncs 512A and 512B, edge detect modules 514A, and PWM control signal generators 510A and 510B.

The embodiment of FIG. 5A includes two ICs in a chain. However, as would be appreciated by those skilled in the relevant art(s) based on the description herein, system 500 can also include more ICs in a chain with similar implementations without departing from the scope and spirit of the present invention.

Example Method Embodiments

Figure 6:
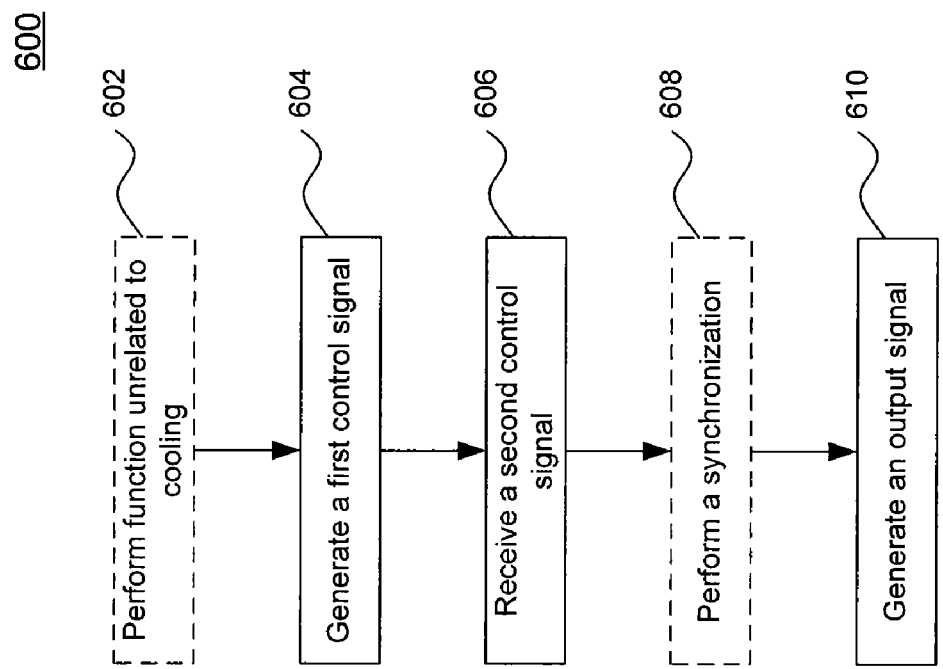
FIG. 6 illustrates a process flowchart for providing cooling to one or more integrated circuits, according to an embodiment of the present invention.

FIG. 6 is an illustration of flowchart 600 providing example steps for providing cooling to one or more ICs, according to the present invention. Other structural and operational embodiments will be apparent to persons skilled in the relevant art(s) based on the following discussion. Flowchart 600 is described with reference to the embodiment of FIG. 4. However, flowchart 600 is not limited to that embodiment. The steps shown in FIG. 6 do not necessarily have to occur in the order shown. The steps of FIG. 6 are described in detail below.

In step 602, a function unrelated to cooling is performed. For example, component 410 of IC 400, shown in FIG. 4, performs operations related to graphics processing. This function may result in heat being generated that requires cooling from a fan.

In step 604, a first control signal is generated. For example, in FIG. 4, control signal generator 406 generates a first control signal based on a signal received from sensor 404. The received signal may include information related to a temperature of IC 400. Alternatively, the signal from sensor 404 can include a desired duty cycle from which control signal generator 406 generates the first control signal.

In step 606, a second control signal is received. For example, in FIG. 4, input module 402 receives a second control signal. Input module 402 may include a multiplexer that chooses a single signal from signals received at several pins based on a value stored in a register or other memory type.

In optional step 608, synchronization is performed. For example, in FIG. 4, synchronization module 412 synchronizes the operation of control signal generator 406 with the second control signal by detecting a characteristic (e.g., a rising or falling edge) of the second control signal and resetting the operation of control signal generator 406 accordingly. In a further embodiment, synchronization may be performed in a substantially similar to the manner described with reference to system 500 shown in FIG. 5A. Furthermore, delay module 414 delays the second control signal to account for the processing by synchronization module 412 and control signal generator 406. In a further embodiment, synchronization may also include removing meta-stable elements from the second control signal.

In step 610 an output signal is generated based on the first and second control signals. For example, in FIG. 4, output module 408 combines the delayed second control signal with the first control signal to generate an output signal. In an embodiment, the combining may include ORing the delayed first control signal with the second control signal.

Thus, step 610 results in an output signal that is the combination of a first and second control signals. For example, the first control signal can be generated based on the temperature of one or more ICs and the second control signal can be generated based a local temperature of the IC that receives the second control signal.

As described above, first and second ICs 502A and 502B may be implementations of IC 400 shown in FIG. 4. Thus, while the above steps are described with respect to IC 400, they may be carried out in by elements of system 500.

Although embodiments described above refer to PWM signals that consist of periods with specified duty cycles, the periods of PWM signals may also be described in terms of the pulse width of each period, as would be appreciated by those skilled in the relevant art(s) based on this description.

Moreover, in embodiments described above, control signals are generated based on required cooling. Control signals can also be generated based on a cooling that is desired, but not necessarily required, without departing from the scope and spirit of the present invention.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
a plurality of devices, each device, comprising:
   a respective control signal generator configured to generate a respective first pulse width modulated (PWM) signal based on a respective sensor signal that is representative of a temperature of the device; and
   a respective output module configured to combine the respective first PWM signal with a respective second PWM signal to generate a respective output PWM signal, wherein the respective output PWM signal is configured to control a cooling device;
wherein each device is coupled to another device of the plurality of devices and wherein an output PWM signal of a first device of the plurality of devices incorporates a cooling requirement based on a combination of an output PWM signal output by a second device of the plurality of devices that is coupled to the first device and the respective first PWM signal of the first device.

2. The system of claim 1, wherein each device of the plurality of devices further comprises a component configured to perform a function unrelated to cooling, wherein the component generates heat that contributes to the temperature of the device, wherein the first output PWM signal of the first device incorporates a cooling requirement of each device of the plurality of devices.

3. The system of claim 1, wherein each device of the plurality of devices further comprises an input module that comprises a multiplexer.

4. The system of claim 1, wherein each device of the plurality of devices further comprises:
   a respective synchronization module configured to detect a characteristic of the respective second PWM signal and synchronize the respective control signal generator to the respective second PWM signal.

5. The system of claim 4, wherein each synchronization module is configured to detect at least one of a rising edge or a falling edge of the respective second PWM signal.

6. The system of claim 4, wherein each control signal generator is configured to reset a counter based on a synchronization signal output by the respective synchronization module.

7. The system of claim 4, wherein each device of the plurality of devices further comprises:
   a respective delay module configured to delay the respective second PWM signal.

8. The system of claim 7, wherein each delay module is configured to delay the respective second PWM signal by a number of clock cycles equal or substantially equal to a number of clock cycles needed to align the respective second PWM signal to the respective first PWM signal.

9. The system of claim 7, wherein each respective output module comprises an OR gate.

10. The system of claim 9, wherein each OR gate is configured to OR a delayed version of the respective second PWM signal with the respective first PWM signal.

11. The system of claim 1, wherein each device further comprises:
    a respective sensor module configured to generate the respective sensor signal based on the temperature of the device.

12. The system of claim 1, wherein each respective second PWM signal is received from another device of the plurality of devices.

13. The system of claim 1, wherein the output PWM signal of the one device of the plurality of devices corresponds to a worst case cooling requirement of the plurality of devices.

14. The system of claim 1, wherein each device of the plurality of devices is an application specific integrated circuit (ASIC).

15. The system of claim 1, wherein the plurality of devices are coupled together in a daisy chain.

16. A method, comprising:
    generating a first PWM signal based at least on a temperature of a first device;
    receiving a second PWM signal that is generated based at least on a temperature of a second device;
    combining, at the first device, the first PWM control signal and the second PWM signal to generate a first output signal; and
    combining, at a third device, the first output signal with a third PWM signal to generate a second output signal, wherein the third PWM signal was generated based on a temperature of the third device, wherein the first, second, and third devices are cooled according to the second output signal;
    wherein the second output signal is configured to control a cooling device.

17. The method of claim 16, further comprising:
    performing, at the first device, a function unrelated to cooling, whereby heat is generated that contributes to a temperature of the first device.

18. The method of claim 16, wherein combining, at the first device comprises:
    ORing a form of the first PWM signal and a form of the second PWM signal.

19. The method of claim 16, further comprising:
    synchronizing a first signal generator that generates the first PWM signal to the second PWM signal, wherein synchronizing comprises detecting a characteristic of the second PWM signal; and
    delaying the second PWM signal.

20. The method of claim 16, wherein the second PWM control signal is generated based at least on the temperature of the second device and a temperature of a fourth device.

* * * * *